United States Patent
Achten et al.

(10) Patent No.: US 11,905,360 B2
(45) Date of Patent: Feb. 20, 2024

(54) METHOD FOR PRODUCING A CROSS-LINKABLE POLYMER WITH THE FORMATION OF OXAZOLIDINONES

(71) Applicant: Covestro Deutschland AG, Leverkusen (DE)

(72) Inventors: Dirk Achten, Leverkusen (DE); Thomas Buesgen, Leverkusen (DE); Roland Wagner, Leverkusen (DE); Florian Stempfle, Cologne (DE); Christoph Tomczyk, Leverkusen (DE)

(73) Assignee: STRATASYS, INC., Eden Prairie, MN (US)

( * ) Notice: Subject to any disclaimer, the term of this patent is extended or adjusted under 35 U.S.C. 154(b) by 847 days.

(21) Appl. No.: 16/754,561

(22) PCT Filed: Oct. 12, 2018

(86) PCT No.: PCT/EP2018/077874
§ 371 (c)(1),
(2) Date: Apr. 8, 2020

(87) PCT Pub. No.: WO2019/073034
PCT Pub. Date: Apr. 18, 2019

(65) Prior Publication Data
US 2020/0255584 A1  Aug. 13, 2020

(30) Foreign Application Priority Data
Oct. 13, 2017 (EP) .................... 17196378

(51) Int. Cl.
| | | |
|---|---|---|
| *C08G 18/81* | (2006.01) | |
| *B33Y 70/00* | (2020.01) | |
| *C08G 18/00* | (2006.01) | |
| *C08G 18/22* | (2006.01) | |
| *C08G 85/00* | (2006.01) | |
| *B33Y 70/10* | (2020.01) | |

(52) U.S. Cl.
CPC .......... *C08G 18/8125* (2013.01); *B33Y 70/00* (2014.12); *C08G 18/003* (2013.01); *C08G 18/225* (2013.01); *C08G 85/002* (2013.01); *B33Y 70/10* (2020.01)

(58) Field of Classification Search
CPC ....... C08G 18/003; C08L 75/04; C08L 75/06; C08L 75/08; C08L 75/10; C08L 75/12; C08L 75/14; C08L 75/16; C08L 2312/06; C08D 175/04; C08D 175/06; C08D 175/08; C08D 175/10; C08D 175/12; C08D 175/14; C08D 175/16; C09D 4/00; C09D 4/06
See application file for complete search history.

(56) References Cited

U.S. PATENT DOCUMENTS

| | | | |
|---|---|---|---|
| 4,522,981 A | 6/1985 | Geist | |
| 4,539,218 A | 9/1985 | Geist | |
| 4,742,146 A | 5/1988 | Hefner, Jr. | |
| 5,126,406 A | 6/1992 | Iwamoto | |
| 5,304,612 A * | 4/1994 | Umetani | C08G 18/1875 528/48 |
| 8,044,235 B2 | 10/2011 | Nozawa et al. | |
| 9,458,281 B2 | 10/2016 | Mueller et al. | |
| 9,550,313 B2 | 1/2017 | Spyrou et al. | |
| 10,385,167 B2 | 8/2019 | Müller et al. | |
| 2006/0089450 A1* | 4/2006 | Jansen | C09D 175/16 524/556 |
| 2017/0081459 A1 | 3/2017 | Müller et al. | |
| 2017/0081462 A1 | 3/2017 | Müller et al. | |
| 2017/0088659 A1 | 3/2017 | Müller et al. | |

FOREIGN PATENT DOCUMENTS

| | | |
|---|---|---|
| CN | 102344539 A | 2/2012 |
| EP | 0071812 A2 | 2/1983 |

OTHER PUBLICATIONS

International Search Report, PCT/EP2018/077874, dated Jan. 16, 2019, Authorized officer: Martin Bergmeier.

\* cited by examiner

*Primary Examiner* — Christopher M Rodd
(74) *Attorney, Agent, or Firm* — Faegre Drinker Biddle & Reath LLP

(57) ABSTRACT

The invention relates to a method for producing a polymer comprising the following steps: (A) depositing a radically cross-linkable resin, obtaining a radically cross-linked resin; and (B) treating the radically cross-linked resin under conditions which are sufficient to trigger a chemical reaction that is different from the radical cross-linking in the radically cross-linked resin. The radically cross-linkable resin comprises a curable component, in which there are NCO groups, olefinic C=C double bonds and epoxide groups, and the chemical reaction in the radically cross-linked resin that is different from the radical cross-linking is the reaction of NCO groups and epoxide groups to form oxazolidinone groups.

11 Claims, No Drawings

METHOD FOR PRODUCING A CROSS-LINKABLE POLYMER WITH THE FORMATION OF OXAZOLIDINONES

CROSS-REFERENCE TO RELATED APPLICATION

This application is a national stage application under 35 U.S.C. § 371 of PCT/EP2018/077874, filed Oct. 12, 2018, which claims the benefit of European Application No. 17196378, filed Oct. 13, 2017, each of which is incorporated herein by reference.

FIELD

The present invention relates to a process for producing a polymer, comprising the steps of: A) depositing a free-radically crosslinkable resin to obtain a free-radically crosslinked resin and B) treating the free-radically crosslinked resin under conditions sufficient to trigger a chemical reaction different than free-radical crosslinking in the free-radically crosslinked resin. The invention further relates to a free-radically crosslinkable resin and to a polymer obtainable by the process.

BACKGROUND

Oxazolidinones are common structural motifs in medicinal chemistry. Cycloaddition of epoxides and isocyanates is one possible way of constructing the oxazolidinone group in a one-pot reaction. The reaction of polyepoxides with polyisocyanates can, moreover, be used to obtain polyoxazolidinones.

Patent applications relating to the preparation of polyoxazolidinones include EP 3 143 060, EP 3 143 059, EP 3 143 065, WO 2016/128380, and EP 2 920 218. WO 2015/173101 (EP 3 143 065) discloses, for example, a method for preparing oxazolidinone compounds comprising the step of reacting an isocyanate with an epoxide in the presence of a Lewis acid catalyst, with the reaction being carried out in the absence of base having a base strength pKa of <5 and at a temperature of >150° C. The isocyanate is added to the epoxide continuously or stepwise in two or more individual addition steps, the amount of isocyanate in each individual addition step being <50% by weight of the total amount of isocyanate to be added.

DE 31 30 545 discloses a synthetic resin based on an epoxide group-containing acrylate copolymer having a number-average molar mass of 1000 to 30 000. The acrylate copolymer consists of a) 20 to 90% by weight of alkyl acrylates having 1 to 18 carbon atoms in the alkyl radical and/or methacrylic esters having 1 to 20 carbon atoms in the alkyl radical, b) 5 to 40% by weight of a hydroxyalkyl acrylate and/or hydroxyalkyl methacrylate, and c) 5 to 40% by weight of glycidyl acrylate and/or glycidyl methacrylate and/or another olefinically unsaturated polymerizable compound bearing an epoxide group, with the sum of components a, b, and c being 100%. Before or after carrying out the copolymerization, the hydroxyl groups of the acrylate copolymer are reacted at least in part with a partially blocked di- and/or polyisocyanate.

This patent application further states that the partially blocked di- or polyisocyanates contain at least an average of one free isocyanate group per molecule and that an average of at least one isocyanate group per molecule has undergone reaction with the blocking agent. The blocking agent chosen here is able to prevent reaction of the blocked isocyanate groups at room temperature and is cleaved off at elevated temperature, so that the isocyanate group becomes reactive. The claimed synthetic resin is therefore stable at room temperature, whereas the free isocyanate groups revealed at elevated temperature, i.e. during baking, are available for crosslinking the synthetic resin. They are then able to react with the epoxide groups of the acrylate copolymer originating from component c, with the formation of oxazolidinone rings. The claimed synthetic resin is therefore self-crosslinking and does not require an additional curing component.

In the technical field of coatings, "dual-cure" systems are known in which the coating material applied in liquid form is first crosslinked by free-radical, for example photochemical, means and then cured further via reactions of NCO groups with suitable co-reactants.

The prior art contains no descriptions to date of radiation-curable resins applied in liquid form having oxazolidinone formation as a second mechanism in dual-cure systems. This would however be desirable in order to have another technology option available.

SUMMARY

It is an object of the present invention to at least partly overcome at least one disadvantage of the prior art. An additional object of the invention is to provide a production process in which the objects or coatings or adhesives to be produced can be obtained in a manner that is as cost-efficient and/or individualized and/or economical with resources as possible.

The object is achieved in accordance with the invention by a process, a resin, and a polymer. Advantageous developments are specified in the dependent claims. They may be freely combined, unless the opposite is clearly evident from the context.

DETAILED DESCRIPTION

What is proposed in accordance with the invention is a process for producing a polymer, comprising the steps of:
  A) depositing a free-radically crosslinkable resin to obtain a free-radically crosslinked resin and
  B) treating the free-radically crosslinked resin under conditions sufficient to trigger a chemical reaction different than free-radical crosslinking in the free-radically crosslinked resin, wherein the free-radically crosslinkable resin comprises a curable component in which NCO groups, olefinic C=C double bonds, and epoxide groups are present, and wherein the chemical reaction in the free-radically crosslinked resin different than free-radical crosslinking is the reaction of NCO groups and epoxide groups to form oxazolidinone groups.

In the process according to the invention, the object is thus obtained in two production phases. The first production phase can be regarded as the build phase. The second production phase can be regarded as the curing phase.

In the context of the present invention, the terms "free-radically crosslinkable resin" and "free-radically crosslinked resin" are used. The free-radically crosslinkable resin is converted here into the free-radically crosslinked resin by exposure and/or irradiation, which triggers free-radical crosslinking reactions. In this context, "exposure" is understood as meaning the action of light in the range between near-IR and near-UV light (wavelengths of 1400 nm to 315 nm). The remaining shorter wavelength ranges are covered by the term "irradiation", for example far-UV light, x-rays, gamma rays, and also electron beams.

The free-radically crosslinkable resin may have a viscosity (23° C., DIN EN ISO 2884-1) of ≥5 mPas to ≤100 000 mPas. It should thus be regarded as a liquid resin. The viscosity is preferably ≥50 mPas to ≤10 000 mPas, more preferably ≥200 mPas to ≤5000 mPas.

In addition to the curable component, the free-radically crosslinkable resin may also comprise a non-curable component in which, for example, stabilizers, fillers, in particular radiation-transparent fillers such as glass fibers, glass beads, silica and the like are combined. The free-radically crosslinkable resin may thus further contain additives such as fillers, UV-stabilizers, free-radical inhibitors, antioxidants, mold-release agents, water scavengers, slip additives, defoamers, flow agents, rheology additives, flame retardants, and/or pigments. These auxiliaries and additives, excluding fillers and flame retardants, are typically present in an amount of less than 80% by weight, preferably less than 60% by weight, more preferably up to 40% by weight, and most preferably not more than 20% by weight, based on the free-radically crosslinkable resin. Flame retardants are typically present in amounts of not more than 70% by weight, preferably not more than 50% by weight, more preferably not more than 30% by weight, calculated as the total amount of employed flame retardants based on the total weight of the free-radically crosslinkable resin.

In addition to transparent fillers that have an inherent transparency to the radiation used to induce irradiation-based free-radical polymerization processes, for examples glasses (in the form of beads, hollow beads, fibrous fillers, etc. that contain SiO2) or transparent polymers such as vinylic polymers, polycarbonates, and polyesters, preferred examples of suitable fillers also include fillers that, on account of their small mean particle size, allow sufficient optical transparency so as not to quantitatively prevent free-radical polymerization processes in the desired layer thicknesses, with mean particle sizes where the particle size is smaller than the wavelength of the incident wavelength of the radiation which induces free-radical polymerization processes being preferred, as are lower concentrations of not more than 20 percent by weight, preferably not more than 10 percent by weight, more preferably not more than 5 percent by weight, of generally reflective fillers that are not inherently radiation-permeable such as $AlOH_3$, $CaCO_3$, $Al2O_3$, metal pigments such as $TiO_2$, and other known customary fillers. Suitable UV stabilizers may preferably be selected from the group consisting of piperidine derivatives such as 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone or 2,2'-dihydroxy-4-dodecyloxybenzophenone; benzotriazole derivatives such as 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl) phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides such as 2-ethyl-2'-ethoxy-methoxyoxalanilide or 4-methyl-4'-methoxyoxalanilide; salicylic esters such as phenyl salicylate, 4-tert-butylphenyl salicylate, 4-tert-octylphenyl salicylate; cinnamic ester derivatives such as methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives such as dimethyl 4-methoxybenzylidenemalonate, diethyl 4-methoxybenzylidenemalonate, dimethyl 4-butoxybenzylidenemalonate. These preferred light stabilizers may be used either individually or in any desired combinations with one another.

Particularly preferred UV stabilizers are those that completely absorb radiation of a wavelength <400 nm. These include, for example, the recited benzotriazole derivatives. Especially preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, and/or 2-(5-chloro-2H-benzotriazol-2-yl)-4,6-bis(1,1-dimethylethyl)phenol.

One or more of the UV stabilizers recited by way of example are optionally added to the free-radically crosslinkable resin preferably in amounts of 0.001 to 3.0% by weight, more preferably 0.005 to 2% by weight, calculated as the total amount of employed UV stabilizers based on the total weight of the free-radically crosslinkable resin.

Suitable antioxidants are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol), and 2,2'-thiodiethyl bis[3-(3,5-di-tert-butyl-4-hydroxyphenyl)propionate]. These may be used either individually or in any desired combinations with one another as required. These antioxidants are preferably employed in amounts of 0.01 to 3.0% by weight, more preferably 0.02 to 2.0% by weight, calculated as the total amount of employed antioxidants based on the total weight of the free-radically crosslinkable resin.

Suitable free-radical inhibitors/retarders are in particular those that specifically inhibit uncontrolled free-radical polymerization of the resin formulation outside the desired (irradiated) region. These are key for good contour sharpness and imaging accuracy in the precursor. Suitable free-radical inhibitors must be chosen according to the desired free-radical yield from the irradiation/exposure step and the polymerization rate and reactivity/selectivity of the double bond compounds. Examples of suitable free-radical inhibitors are 2,2-(2,5-thiophenediyl)bis(5-tert-butylbenzoxazole), phenothiazine, hydroquinones, hydroquinone ethers, quinone alkyds and nitroxyl compounds and mixtures thereof, benzoquinones, copper salts, catechols, cresols, nitrobenzene, and oxygen. These antioxidants are preferably used in amounts of 0.001% by weight to 3% by weight.

Embodiments and further aspects of the present invention are elucidated hereinbelow. These may be freely combined with one another, unless the opposite is clearly evident from the context.

In a preferred embodiment, the curable component comprises a curable compound that contains epoxide groups and olefinic C═C double bonds. This compound may be an epoxy-functional acrylate or methacrylate. Compounds of this class of substances may be obtained from the reaction of polyepoxides with hydroxyalkyl (meth)acrylates, with the chosen stoichiometry of the reactants such that the hydroxyalkyl (meth)acrylate is present substoichiometrically and hitherto unreacted epoxy groups accordingly remain in the product.

Examples of polyepoxides suitable for this purpose are the isomeric bis[4-(glycidyloxy)phenyl]methanes, 1,3-butadiene diepoxide, 1,4-butanediol diglycidyl ether, the isomeric 1,4-cyclohexanedimethanol diglycidyl ethers, the isomeric dicyclopentadiene dioxides, 1,2,5,6-diepoxycyclooctane, 1,2,7,8-diepoxyoctane, diglycidyl 1,2-cyclohexanedicarboxylate, N,N-diglycidyl-4-glycidyloxyaniline, 3,4-epoxycyclohexylmethyl 3,4-epoxycyclohexanecarboxylate, glycerol diglycidyl ether, diglycidyl ether, poly(ethylene glycol) diglycidyl ether, poly(propylene glycol) diglycidyl ether, 4,4'-methylenebis(N,N-diglycidylaniline), neopentyl glycol diglycidyl ether, resorcinol diglycidyl ether, tetraphenylolethane glycidyl ether, tris(2,3-epoxypropyl) isocyanurate, tris(4-hydroxyphenyl) methane triglycidyl ether, trimethylolpropane triglycidyl ether, or a combination of at least two thereof.

In the interests of keeping the vapor pressure as low as possible, preference is given to poly(ethylene glycol) diglycidyl ethers, poly(propylene glycol) diglycidyl ethers, and higher derivatives thereof derived from at least trifunctional starters.

Examples of suitable hydroxyalkyl (meth)acrylates are 2-hydroxyethyl acrylate, 2-hydroalkyl methacrylate, 3-hydroxypropyl acrylate, 3-hydroxypropyl methacrylate, 4-hydroxybutyl acrylate, 4-hydroxybutyl methacrylate or a combination of at least two thereof.

Examples of suitable polyisocyanates for the reaction in step B) of this embodiment of the process according to the invention are those that have a molecular weight in the range from 140 to 400 g/mol, having aliphatically, cycloaliphatically, araliphatically, and/or aromatically attached isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates.

It is additionally possible in accordance with the invention also to use aliphatic and/or aromatic prepolymers bearing isocyanate end groups, for example aliphatic or aromatic polyether, polyester, polyacrylate, polyepoxide or polycarbonate prepolymers bearing isocyanate end groups. In the interests of having a low vapor pressure, NCO-terminated prepolymers are preferred.

The reactions of the compound in the process according to the invention are illustrated schematically hereinbelow by way of example. The epoxy- and methacrylate-functional compound has an $R^1$ group that links the epoxide group and the methacrylate group. $R^1$ may in turn also bear further epoxy groups and/or (meth)acrylate groups. In step A) of the process according to the invention, a photochemical cross-linking to an epoxy-functional polymer takes place. This is followed by the reaction of an already-present isocyanate $R^2$—NCO with the epoxide groups to form oxazolidinone groups. $R^2$ may bear further NCO groups, and so may be a polyisocyanate.

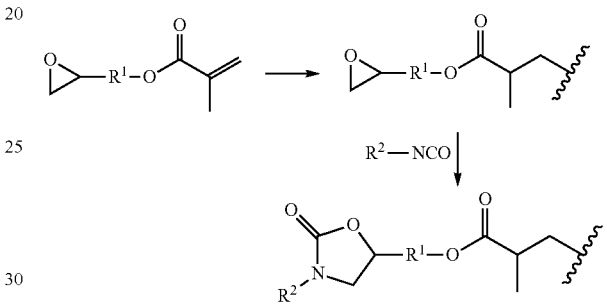

In a further preferred embodiment, the curable component comprises a curable compound that contains NCO groups and olefinic C═C double bonds. This compound may be an NCO-functional acrylate or methacrylate. Compounds of this class of substances may be obtained from the reaction of polyisocyanates with hydroxyalkyl (meth)acrylates, with the chosen stoichiometry of the reactants such that the hydroxyalkyl (meth)acrylate is present substoichiometrically and hitherto unreacted NCO groups accordingly remain in the product.

Examples of suitable hydroxyalkyl (meth)acrylates are 2-hydroxyethyl acrylate, 2-hydroalkyl methacrylate, 3-hydroxypropyl acrylate, 3-hydroxypropyl methacrylate, 4-hydroxybutyl acrylate, 4-hydroxybutyl methacrylate or a combination of at least two thereof.

Examples of suitable polyisocyanates for the reaction are those that have a molecular weight in the range from 140 to 400 g/mol, having aliphatically, cycloaliphatically, araliphatically, and/or aromatically attached isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene, and any desired mixtures of such diisocyanates.

It is additionally possible in accordance with the invention also to use aliphatic and/or aromatic prepolymers bearing isocyanate end groups, for example aliphatic or aromatic polyether, polyester, polyacrylate, polyepoxide or polycarbonate prepolymers bearing isocyanate end groups. In the interests of having a low vapor pressure, NCO-terminated prepolymers are preferred.

Examples of suitable polyepoxides for step B) in this embodiment of the process according to the invention are the isomeric bis[4-(glycidyloxy)phenyl]methanes, 1,3-butadiene diepoxide, 1,4-butanediol diglycidyl ether, the isomeric 1,4-cyclohexanedimethanol diglycidyl ethers, the isomeric dicyclopentadiene dioxides, 1,2,5,6-diepoxycyclooctane, 1,2,7,8-diepoxyoctane, diglycidyl 1,2-cyclohexanedicarboxylate, N,N-diglycidyl-4-glycidyloxyaniline, 3,4-epoxycyclohexylmethyl 3,4-epoxycyclohexanecarboxylate, glycerol diglycidyl ether, diglycidyl ether, poly(ethylene glycol) diglycidyl ether, poly(propylene glycol) diglycidyl ether, 4,4'-methylenebis(N,N-diglycidylaniline), neopentyl glycol diglycidyl ether, resorcinol diglycidyl ether, tetraphenylolethane glycidyl ether, tris(2,3-epoxypropyl) isocyanurate, tris(4-hydroxyphenyl) methane triglycidyl ether, trimethylolpropane triglycidyl ether, or a combination of at least two thereof.

In the interests of keeping the vapor pressure as low as possible, preference is given to poly(ethylene glycol) diglycidyl ethers, poly(propylene glycol) diglycidyl ethers, and higher derivatives thereof derived from at least trifunctional starters.

The reactions of the compound in the process according to the invention are illustrated schematically hereinbelow by way of example. The NCO- and methacrylate-functional compound has an $R^3$ group that links the NCO group and the methacrylate group. $R^3$ may in turn also bear further NCO groups and/or (meth)acrylate groups. In step A) of the process according to the invention, a photochemical crosslinking to an NCO-functional polymer takes place. This is followed by the reaction of an already-present epoxide $R^4$—(CH—CH$_2$O) with the NCO groups to form oxazolidinone groups. $R^4$ may bear further epoxide groups, and so may be a polyepoxide.

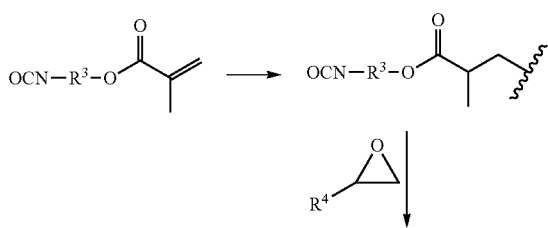

-continued

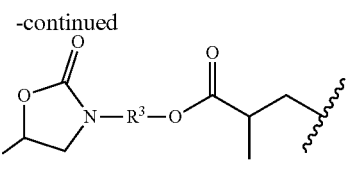

In a further preferred embodiment, the free-radically crosslinkable resin further comprises a free-radical initiator and/or a Lewis acid catalyst. To prevent an undesired increase in the viscosity of the free-radically crosslinkable resin, it is possible to add the free-radical initiator and/or Lewis acid catalyst to the resin only immediately before commencement of the process according to the invention.

Potential free-radical initiators include thermal and/or photochemical free-radical initiators (photoinitiators). It is also possible to use thermal and photochemical free-radical initiators at the same time. Examples of suitable thermal free-radical initiators are azobisisobutyronitrile (AIBN), dibenzoyl peroxide (DBPO), di-tert-butyl peroxide, and/or inorganic peroxides such as peroxodisulfates.

In the case of the photoinitiators, a basic distinction is made between two types, the unimolecular type (I) and the bimolecular type (II). Examples of suitable type (I) systems are aromatic ketone compounds such as benzophenones in combination with tertiary amines, alkyl benzophenones, 4,4'-bis(dimethylamino)benzophenone (Michler's ketone), anthrone, and halogenated benzophenones or mixtures of said types. Also suitable are type (II) initiators such as benzoin and derivatives thereof, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones, and α-hydroxyalkylphenones. Specific examples are Irgacur®500 (a mixture of benzophenone and 1-hydroxycyclohexyl phenyl ketone, from Ciba, Lampertheim, DE), Irgacure®819 DW (phenylbis(2,4,6-trimethylbenzoyl)phosphine oxide, from Ciba, Lampertheim, DE) or Esacure® KIP EM (oligo-[2-hydroxy-2-methyl-1-[4-(1-methylvinyl)phenyl]propanones], from Lamberti, Aldizzate, Italy), and bis(4-methoxybenzoyl)diethylgermane. Mixtures of these compounds may also be used.

It needs to be ensured that the photoinitiators have sufficient reactivity toward the radiation source used. Numerous commercially available photoinitiators are known. The entire wavelength range of the UV-VIS spectrum is covered by commercially available photoinitiators. Photoinitiators find use in the production of paints, printing inks, and adhesives and also in the dental sector.

In the process according to the invention, the photoinitiator is generally employed in a concentration, based on the amount of the employed curable component bearing olefinically-unsaturated double bonds, of 0.01 to 6.0% by weight, preferably of 0.05 to 4.0% by weight, and more preferably of 0.1 to 3.0% by weight, In the process according to the invention, the Lewis acid catalyst is generally employed in a concentration based on the amount of the employed curable component of 0.0005 to 5.0% by weight, preferably of 0.0010 to 2.0% by weight, and more preferably of 0.0015 to 1.0% by weight.

An example of a suitable Lewis acid catalyst is a catalyst of the general formula $[M(R1)(R2)(R3)(R4)]^+{}_nY^{n-}$
where M is phosphorus or antimony, (R1), (R2), (R3), and (R4) are independently linear or branched, optionally heteroatom-substituted $C_1$-$C_{22}$ alkyl, $C_3$-$C_{23}$ cycloalkyl, $C_1$-$C_3$ bridged cycloaliphatic groups having 3 to 22 carbon atoms or (hetero)aryl groups having 6 to 18 carbon atoms, Y is a halide, carbonate, nitrate, sulfate or phosphate anion and n is 1, 2 or 3.

In a further preferred embodiment, the radical initiator is selected from the group consisting of α-hydroxyphenyl ketone, benzyl dimethyl ketal, 2,4,6-trimethylbenzoyldiphenylphosphine oxide, bis(4-methoxybenzoyl)diethylgermane (Ivocerin®) or a combination of at least two thereof and/or the Lewis acid catalyst is selected from: [PPh$_3${p-C$_6$H$_4$(OMe)}]Br, PPh$_3${p-C$_6$H$_4$(OMe)}]$_2$(CO$_3$), [PPh$_4$]Br, [P(n-Bu)$_4$]Br, [PPh$_3$(CH$_2$-adamantyl)]Br, [PPh$_3$(cyclohexyl)]Br, or a combination of at least two thereof.

Preferably, the Lewis acid catalyst is selected from the group consisting of MgCl, LiBr, LiCl, and lithium carbene or a mixture of at least two thereof.

In a further preferred embodiment the treating of the free-radically crosslinked resin under conditions sufficient to trigger a chemical reaction different than free-radical crosslinking in the free-radically crosslinked resin comprises heating at a temperature of ≥60° C. This temperature is preferably ≥80° C. to ≤250° C., more preferably ≥90° C. to ≤190° C. The chosen temperature or chosen temperature range may be maintained for example for ≥5 minutes to ≤48 hours, preferably ≥15 minutes to ≤24 hours, and more preferably ≥1 hour to ≤12 hours.

In a further preferred embodiment, the surface of the precursor obtained in step A) and/or of the object obtained in step B) is contacted with a compound having Zerewitinoff-active hydrogen atoms, where water occurring as natural atmospheric humidity in the air surrounding the precursor and/or the object is excluded. Surface functionalization can be achieved by the reaction of residual free NCO groups with such compounds. The compound having Zerewitinoff-active hydrogen atoms may be brought into contact with the surface of the precursor by for example immersion, spray application or spreading. A further possibility is contacting via the gas phase, for example using ammonia or water vapor. A catalyst may optionally accelerate the reaction.

Examples of compounds suitable as the functionalization reagent are alcohols, amines, acids and derivatives thereof, epoxides, and in particular polyols such as sugars, polyacrylate polyols, polyester polyols, polyether polyols, polyvinyl alcohols, polycarbonate polyols, polyether carbonate polyols and polyester carbonate polyols, long-chain aliphatic alcohols, fluorinated or chlorinated alcohols. Further examples are polyacrylic acid, polyamides, polysiloxanes, polyacrylamides, polyvinylpyrrolidones, polyvinyl butyrate, polyketones, polyether ketones, polyacetals, and polyamines. Amines may also be used for the specific formation of ureas.

It is preferable to employ a long-chain alkyl alcohol, a long-chain (secondary) alkyl amine, a fatty acid, an epoxidized fatty acid ester, a (per)fluorinated long-chain alcohol or mixtures thereof. "Long-chain" is to be understood here as meaning 6 or more carbon atoms, preferably 8 or more carbon atoms, more preferably 10 or more carbon atoms in the longest chain of the compound. The preparation of modified polyisocyanates is known in principle and described for example in EP-A 0 206 059 and EP-A 0 540 985. It is carried out preferably at temperatures of 40° C. to 180° C.

In a further preferred embodiment, the free-radically crosslinkable resin is applied as a coating to a substrate. In this case, the process according to the invention can be regarded as a coating process.

In a further preferred embodiment, the free-radically crosslinkable resin is applied as a coating to at least one substrate and contacted with at least one further substrate. In this case, the process according to the invention can be regarded as a process for adhesively bonding substrates. In a preferred embodiment, at least one substrate here is at least partially transparent to the radiation used.

In a further preferred embodiment, the process is an additive production process for producing an object from a precursor, with the precursor being obtained in step A) and the object being obtained in step B).

In a further preferred embodiment, step A) comprises the steps of:
I) depositing free-radically crosslinked resin on a carrier so as to obtain a ply of build material joined to the carrier that corresponds to a first selected cross section of the precursor;
II) depositing free-radically crosslinked resin onto a previously applied ply of the build material to obtain a further ply of the build material that corresponds to a further selected cross section of the precursor and that is joined to the previously applied ply;
III) repeating step II) until the precursor is formed;
wherein the depositing of the free-radically crosslinked resin at least in step II) is achieved by exposure and/or irradiation of a selected region of the free-radically crosslinkable resin corresponding to the respectively selected cross section of the precursor.

In this embodiment, step B) additionally comprises the step of:
IV) treating the precursor obtained in step III) under conditions sufficient for reaction, in the free-radically crosslinked resin of the precursor obtained, of NCO groups and epoxide groups to form oxazolidinone groups.

This build phase may be executed by means of ray optics-based additive production processes such as the inkjet process, stereolithography or the DLP (digital light processing) process and is represented by steps I), II), and III). The curing phase is represented by step IV). The precursor or intermediate object obtained after the build phase is converted here to a more mechanically durable object without any further change in the shape thereof. In the context of the present invention, the material from which the precursor is obtained in the additive production process is generally referred to also as "build material".

Step I) of the process comprises depositing a free-radically crosslinked resin on a carrier. This is usually the first step in inkjet, stereolithography and DLP processes. In this way, a ply of a build material joined to the carrier that corresponds to a first selected cross section of the precursor is obtained.

As per the instruction of step III), step II) is repeated until the desired precursor is formed. Step II) comprises depositing the free-radically crosslinked resin onto a previously applied ply of the build material to obtain a further ply of the build material that corresponds to a further selected cross section of the precursor and that is joined to the previously applied ply. The previously applied ply of the build material may be the first ply from step I) or a ply from a previous iteration of step II).

According to the invention, a free-radically crosslinked resin is—at least in step II) (and preferably in step I too)—deposited through exposure and/or irradiation of a selected region of a free-radically crosslinkable resin corresponding to the respectively selected cross section of the object. This may be achieved both by selective exposure (stereolithography, DLP) of the resin and by selective application of the resin followed by an exposure step which, on account of the preceding selective application of the resin, need no longer be selective (inkjet process).

The respective cross section is expediently selected by a CAD program with which a model of the object to be produced has been created. This operation is also known as "slicing" and serves as a basis for controlling the exposure and/or irradiation of the free-radically crosslinkable resin.

In a further preferred embodiment, the process has the following features:
- the carrier is positioned inside a container and can be lowered vertically in the direction of gravity,
- the container contains the free-radically crosslinkable resin in an amount sufficient to cover at least the carrier and crosslinked resin deposited on the carrier,
- before each step II) the carrier is lowered by a predetermined distance so that a layer of the free-radically crosslinkable resin forms above the uppermost ply of the build material viewed in the vertical direction, and
- in step II) an energy beam exposes and/or irradiates the selected region of the layer of the free-radically crosslinkable resin corresponding to the respectively selected cross section of the precursor.

This embodiment accordingly covers the additive production process of stereolithography (SLA). The carrier may for example be lowered by a predetermined distance of ≥1 μm to ≤2000 μm in each case.

In a further preferred embodiment, the process has the following features:
- the carrier is positioned inside a container and can be raised vertically counter to the direction of gravity,
- the container provides the free-radically crosslinkable resin,
- before each step II) the carrier is raised by a predetermined distance so that a layer of the free-radically crosslinkable resin forms below the lowermost ply of the build material viewed in the vertical direction, and
- in step II) a plurality of energy beams simultaneously exposes and/or irradiates the selected region of the layer of the free-radically crosslinkable resin corresponding to the respectively selected cross section of the precursor.

This embodiment accordingly covers the additive production process of DLP technology if the plurality of energy beams generates the image to be provided by exposure and/or irradiation via an array of individually actuatable micromirrors. The carrier may for example be raised by a predetermined distance of ≥1 μm to ≤2000 μm in each case.

In a further preferred embodiment, the free-radically crosslinkable resin is applied from one or more print heads in accordance with the respectively selected cross section of the precursor and is subsequently exposed and/or irradiated.

This embodiment accordingly covers the additive production process of the inkjet method: the crosslinkable resin, optionally separately from the catalysts according to the invention, is applied selectively via one or more print heads and the subsequent curing by irradiation and/or exposure may be nonselective, for example via a UV lamp. The one or more print heads for applying the resin may comprise a (modified) print head for inkjet printing processes. The carrier may be configured to be movable away from the print head or the print head may be configured to be movable away from the carrier. The increments of the spacing movements between carrier and print head may be within a range of, for example, ≥1 μm to ≤2000 μm.

A further aspect of the invention is a free-radically crosslinkable resin that comprises a curable component in which NCO groups, olefinic C=C double bonds, and epoxide groups are present. To avoid repetition, reference is generally made to the remarks relating to the process of the invention.

In a preferred embodiment, the curable component comprises a curable compound that contains epoxide groups and olefinic C=C double bonds. This compound may be an epoxy-functional acrylate or methacrylate. Compounds of this class of substances may be obtained from the reaction of polyepoxides with hydroxyalkyl (meth)acrylates, with the chosen stoichiometry of the reactants such that the hydroxyalkyl (meth)acrylate is present substoichiometrically and hitherto unreacted epoxy groups accordingly remain in the product.

In a further preferred embodiment, the curable component comprises a curable compound that contains NCO groups and olefinic C=C double bonds. This compound may be an NCO-functional acrylate or methacrylate. Compounds of this class of substances may be obtained from the reaction of polyisocyanates with hydroxyalkyl (meth)acrylates, with the chosen stoichiometry of the reactants such that the hydroxyalkyl (meth)acrylate is present substoichiometrically and hitherto unreacted NCO groups accordingly remain in the product.

A particular advantage that arises from the use of the compositions according to the invention and the process according to the invention for the uses according to the invention is that the formulations in the two-stage process after steps A and B can have low shrinkage and accordingly better dimensional stability and lower internal stress. Preferably, the shrinkage of the formulation after step A is ≤7%, preferably ≤5%, more preferably ≤3% and the shrinkage of the precursor from A, after step B, through the reaction of isocyanates with epoxides to form oxazolidinones, is ≤3%, preferably ≤2%, more preferably ≤1.5%, and most preferably ≤1%.

The invention likewise relates to a polymer obtainable by a process of the invention.

In a preferred embodiment, the polymer is present as a coating on a substrate and/or between two substrates.

In a further preferred embodiment, the polymer is present as an additively produced object.

EXAMPLES

Step A) of a process according to the invention was carried out using a formulation consisting of:

100 g of an acrylate-functionalized isocyanate cyanurate based on hexamethylene diisocyanate as reaction product of the 1,6-HDI trimer with hydroxyethyl acrylate and having the following idealized structure:

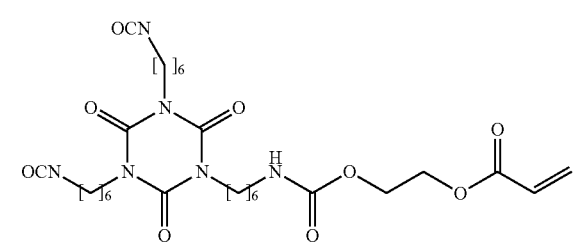

35 g of the diepoxide 1,6-hexanediol diglycidyl ether Denacol® EX-212, obtained from Nagase ChemteX.

1.3 g of the catalyst lithium bromide, 1% in butyl acetate, both obtained from Sigma Aldrich.

27 g of isobornyl acrylate, obtained from Sigma Aldrich.

0.165 g of BBOT: 2,2'-(2,5-thiophenediyl)bis(5-(1,1-dimethylethyl)benzoxazole; UV blocker obtained from Sigma-Aldrich.

1.27 g of the photoinitiator Omnirad BL 750, obtained from 1GMResins.

The formulation was mixed in a lidded plastic cup using a Thinky ARE250 planetary mixer at room temperature at a speed of rotation of 2000 revolutions per minute for about 2 minutes.

The mixed formulation was used to produce test bars with dimensions of 60×10×2 mm on an Autodesk Ember DLP-based 3D printer in accordance with step B) of the process according to the invention. The wavelength for the exposure was 405 nm. The layer thickness was 50 µm in each case. The exposure time was 4 s per layer.

As inventive example 1, a test bar produced from the formulation was heated for 60 minutes at 190° C. in a circulating-air drying oven. The comparative example did not undergo any such heat treatment but was kept at room temperature, i.e. at a temperature within a range of 22 to 25° C.

To verify the effect of the heat treatment at 190° C. of the inventive example versus the comparative example without such heat treatment, an FT-IR spectrum was recorded using an FT-IR spectrometer (Tensor II) from Bruker. For this, a sample of inventive example 1 and a sample of the comparative example were characterized. Each sample film was brought into contact with the Platinum ATR unit. The contact area of the sample was 2×2 mm. During an FT-IR measurement, the IR radiation penetrates approximately 3 to 4 µm into the sample, depending on the wavenumber. An absorption spectrum of the sample was recorded in this manner. To compensate for nonuniform contacting of samples having different hardnesses, a baseline correction and a normalization in the 2600-3200 wavenumber range (CH2, CH3) were performed on all spectra. Interpolation of the epoxide group was carried out in the 897 to 921 wavenumber range; oxazolidinone formation was detected in the 1743 to 1768 wavenumber range. To minimize the influence of other chemical groups, the spectra were integrated down to the baseline under the graphs in the specified wavenumber ranges and these surface areas were then subtracted from one another. This allowed a determination of the chemical reaction of the employed epoxides with isocyanate to oxazolidinone to be demonstrated, since the spectra have different peak heights in different regions of the wavenumber range, which provides demonstration of the reaction of the respective reactive groups:

For the 897 to 921 wavenumber range of the epoxide group, a difference in peak area of 4.6 was obtained;

For the 1743 to 1768 wavenumber range of the oxazolidinone group, a difference in peak area of 2.8 was obtained.

From this it can be seen that, during the subsequent heat treatment, the epoxide groups react with isocyanates to form oxazolidinones and thus crosslink the polymer chains with one another.

Martens hardness measurements in accordance with DIN EN ISO 14577 were carried out on the samples of the inventive example and of the comparative example using a Fischerscope H100C microhardness tester from Fischer. In this determination, the film surface was penetrated by a pyramid-shaped diamond and the hardness value determined therewith.

The inventive test specimen that underwent heat treatment at 190° C. had a Martens hardness of 108.6 N/mm$^2$; the non-heat-treated test specimen kept at RT in accordance with the comparative example had a Martens hardness of 0.3 N/mm$^2$.

This substantial increase in Martens hardness is, in turn, an indication of crosslinking between epoxide and isocyanate groups. An effect in the test specimens treated in accordance with the invention versus the test specimens that did not undergo such treatment (comparative experiment) was thus demonstrated.

The invention claimed is:

1. A process for producing a polymer, comprising:
   Step A) depositing a free-radically crosslinkable resin to obtain a free-radically crosslinked resin; and
   Step B) treating the free-radically crosslinked resin under conditions sufficient to trigger a chemical reaction different than free-radical crosslinking in the free-radically crosslinked resin,
   wherein the free-radically crosslinkable resin comprises a curable component in which NCO groups, olefinic C=C double bonds, and epoxide groups are present, and
   wherein the chemical reaction in the free-radically crosslinked resin different than free-radical crosslinking is a reaction of NCO groups and epoxide groups to form oxazolidinone groups.

2. The process as claimed in claim 1, wherein the curable component comprises a curable compound that contains epoxide groups and olefinic C=C double bonds.

3. The process as claimed in claim 1, wherein the curable component comprises a curable compound that contains NCO groups and olefinic C=C double bonds.

4. The process as claimed in claim 1, characterized in that the free-radically crosslinkable resin further comprises a free-radical initiator and/or a Lewis acid catalyst.

5. The process as claimed in claim 1, wherein treating the free-radically crosslinked resin under conditions sufficient to trigger a chemical reaction different than free-radical crosslinking in the free-radically crosslinked resin comprises heating at a temperature of ≥60° C.

6. The process as claimed in claim 1, wherein the free-radically crosslinkable resin is applied as a coating to a substrate.

7. The process as claimed in claim 1, wherein the process is an additive production process and wherein the polymer is in the form of an object formed from a precursor, wherein in step A) the free-radically crosslinked resin is the precursor and the treating in step B) results in obtaining the object.

8. The process as claimed in claim 7, wherein the depositing in step A) comprises:
   I) depositing the free-radically crosslinked resin on a carrier to obtain a ply of build material joined to the carrier that corresponds to a first selected cross section of the precursor;
   II) depositing the free-radically crosslinked resin onto the ply of build material to obtain a further ply of build material that corresponds to a further selected cross section of the precursor that is joined to the previously applied ply;
   III) repeating step II) until the precursor is formed;
   wherein depositing the free-radically crosslinked resin at least in step II) further comprises exposure and/or irradiation of a selected region of the free-radically crosslinkable resin corresponding to the respectively selected cross section of the precursor and
   the treating in step B) comprises:

IV) treating the precursor obtained in step III) under conditions sufficient for reaction of NCO groups and epoxide groups to form oxazolidinone groups.

9. The process as claimed in claim 8, further comprising:
lowering the carrier by a predetermined distance before each step II) so that a layer of the free-radically crosslinkable resin forms above the uppermost ply of build material viewed in the vertical direction, and
exposing and/or irradiating the selected region of the layer of the free-radically crosslinkable resin corresponding to the respectively selected cross section of the precursor with an energy beam in step II),
wherein the carrier is positioned inside a container and is vertically lowerable in the direction of gravity, and
wherein the container contains the free-radically crosslinkable resin in an amount sufficient to cover at least the carrier and crosslinked resin deposited on the carrier.

10. The process as claimed in claim 8, further comprising:
raising the carrier before each step II) by a predetermined distance so that a layer of the free-radically crosslinkable resin forms below the lowermost ply of build material viewed in the vertical direction,
providing the free-radically crosslinkable resin to the carrier from the container, and
simultaneously exposing and/or irradiating the selected region of the layer of the free-radically crosslinkable resin corresponding to the respectively selected cross section of the precursor with a plurality of energy beams in step II),
wherein the carrier is positioned inside a container and is vertically raisable counter to the direction of gravity.

11. The process as claimed in claim 8, further comprising:
applying the free-radically crosslinkable resin from one or more print heads in step II) in accordance with the respectively selected cross section of the precursor and subsequently exposing and/or irradiating the respectively selected cross section of the precursor with an energy beam.

* * * * *